Dec. 15, 1942.  H. U. GARRETT ET AL  2,305,250
FLOW VALVE
Filed Feb. 23, 1939  2 Sheets-Sheet 2
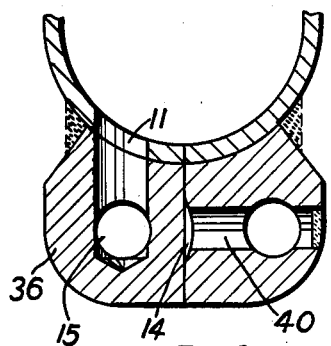
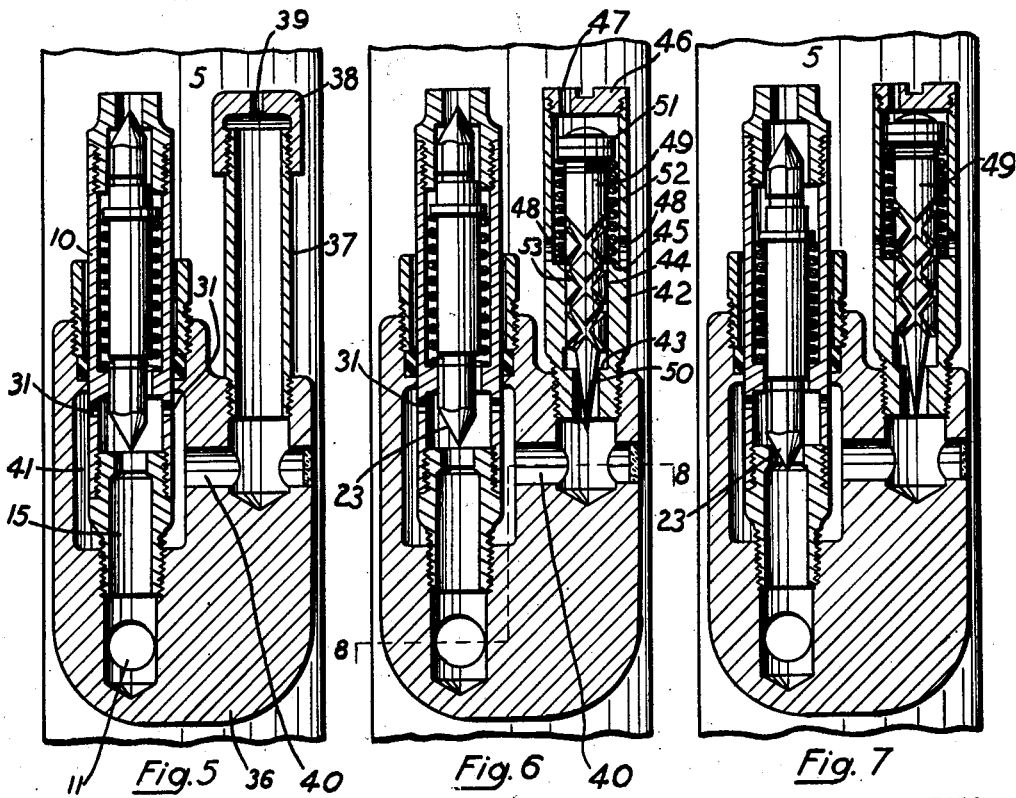
INVENTORS
HENRY UDELL GARRETT AND
BY CLYDE V. TEMPLE
Hastings W. Baker
ATTORNEY.

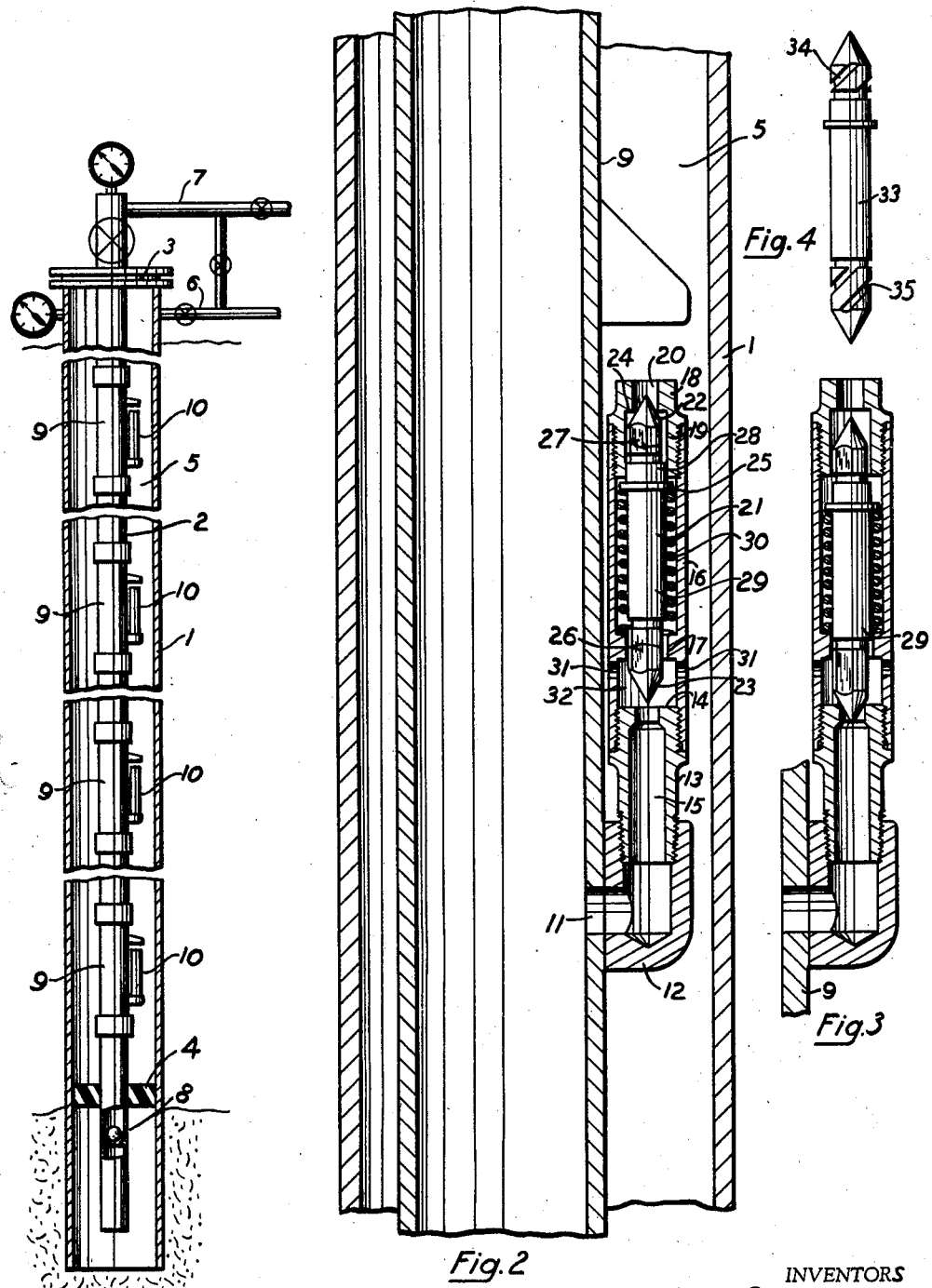

Patented Dec. 15, 1942

2,305,250

UNITED STATES PATENT OFFICE 2,305,250

FLOW VALVE

Henry Udell Garrett, Dallas, and Clyde V. Temple, Tyler, Tex., assignors to The Guiberson Corporation, Dallas, Tex., a corporation of Delaware Application February 23, 1939, Serial No. 257,806

24 Claims. (Cl. 103—233)

This invention relates to an improved flow valve and has reference to a valve mechanism whereby gas or air may be admitted into the flow line from any pressure source outside of the flow line, such as from the pressure chamber between the casing and the flow line.

One of the important objects of the invention is to provide a flow valve which will seal or close the passageway leading from the pressure zone into the flow line until such time as the pressure in the flow line induced by the weight of a column of oil therein exceeds a given pressure, at which time the flow valve will be automatically opened so as to admit the pressure gas into the column of oil in the flow line and which flow valve is so constructed that when the pressure in the flow line falls to a predetermined point, the valve will be again closed.

Another important feature of the invention is means whereby the effective pressure moving the valve will be greatly increased producing a snap action effect as soon as the valve is moved from its seat in either the closing or the opening operation.

Another object of the invention is a provision of means to conserve the gas pressures in the pressure chamber so as to utilize the minimum amount of pressure gas to aerate and lift the oil in the flow line.

Another object of the invention is to provide a regulator or governor to limit the amount of gas which will be admitted into the flow valve. The flow valve is entirely operative without such a regulator, but with the use of such a regulator the pressure gas is conserved.

Another object of the invention is not only to provide a regulator, but to provide a regulating device which has a constant delivery of pressure to the valve in the flow line ports regardless of the pressure in the casing.

Other objects and advantages of the invention will appear in the detailed specification and claims which follow.

In the drawings a preferred embodiment of the invention is shown by way of illustration, but without any intent of limiting the invention to the exact arrangement and proportion of the parts, as obviously many variations may be made therein without departing from the spirit of the invention.

In the drawings,

Fig. 1 is a side elevational view partly in cross section showing a well equipped with a flow line having incorporated therein our improved flow valve either with or without the regulator, Fig. 2 is an enlarged side elevational view, principally in cross section, of the flow valve mounted on a flow line within the casing, Fig. 3 is a similar view of the flow valve showing the position of the valve in closed position, whereas in Fig. 2 it was shown in open position, Fig. 4 is a side elevational view of a modified valve having spiral by-passes instead of the flat-sided by-passes shown in Fig. 3, Fig. 5 is a cross sectional elevational view of the flow valve in conjunction with a regulator to govern the amount of gas which is admitted to the flow valve. The amount of gas which is admitted into this regulator will, of course, govern the pressure existing therein, Fig. 6 is a view similar to Fig. 5, but in addition showing a constant delivery regulator, the flow valve being shown in open position, Fig. 7 is a view similar to Fig. 6, but showing the parts in the position in which they would be when the flow valve was in closed position, and Fig. 8 is a cross sectional view taken on the line 8—8 of Fig. 6.

In the drawings the well is provided with a casing 1 which receives the conventional flow line 2. The casing is sealed at its upper end with a head 3 and a packer 4 is provided near the lower end of the flow line or at least below the lowermost of the valves, which packer creates a seal between the flow line and the casing. The chamber 5 between the flow line and the casing and above the packer 4 and below the head 3 constitutes a pressure chamber and air or other gas under pressure is forced therein through a pipe 6. The flow line extends through the head 3 and a pipe 7 leads from the upper end of the flow line to a storage tank for the oil. These pipes are provided with the conventional valves which form no part of the invention.

Oil flows from the oil producing sands through the lower portion of the casing below the packer 4, and upwardly through the flow line, around the conventional ball valve 8, the oil passing upwardly into the flow line to whatever distance it is forced by the pressure in the oil producing sands, thereby making a head of oil in the flow line. In a flowing well, of course, this oil is conducted to the surface by the pressures within the well, but after these pressures have been exhausted to a point where they are unable to force the oil to the surface, they would still force the oil a portion of the distance so that there would be a head of oil in the flow line depending upon whatever pressure we had in the well. The ball valve 8 prevents the return of the head of oil in the flow line.

In order to lift this oil to the surface, we have provided a plurality of sections 9 in the flow line and each of these sections is provided with a flow valve 10. As many flow valves may be provided as is considered desirable. The lowermost of the flow valves would be above the packer 4 and the uppermost one would be a distance below the height of the head of oil in the flow line when the head was at its maximum. In operation these valves would successively open, as is well understood in the art, so as to aerate the head of oil and lift it to the surface and out through the pipe 7. All of these flow valves are of the same construction, except that the spring in each of them may be of a different tension or strength so that the valves will successively open. Since all of the flow valves are of substantially the same construction, a description of one will describe all. The section 9 is provided with a port 11 through which compressed gas may be introduced into the flow line. Secured to the section by welding or other suitable means is an elbow 12 and screwed into this elbow is a connection 13 provided at its upper end with a valve seat 14. A passageway 15 extends from said valve seat 14 through the said connection 13 and elbow 12 to the port 11. Secured to the connection 13 is a hollow housing 16. The housing 16 is provided with an inwardly extending portion 17 forming a lower cylinder. A nipple 18 is secured to the upper end of the housing 16 and is provided with a cylindrical portion 19 forming an upper cylinder. The nipple 18 is provided with a vertically extending port 20.

The valve body 21 is provided with an upper conical valve 22 and a lower conical valve 23. When the valve body 21 is in its lowermost position, or what we will hereinafter describe as its closed position, the lower valve 23 is seated on the valve seat 14 and prevents compressed air or gas from passing into the passageway 15. When the valve body is in its uppermost position, the valve 23 is elevated above the valve seat 14 as is shown in Fig. 2 and the valve 22 is seated against a valve seat 24 at the lower end of the port 20. The valve body 21 is provided with a collar 25 which is a little smaller than the inner dimensions of the housing 16 so that air or compressed gas may readily pass from the upper to the lower side of the said collar or vice-versa. As shown in Figs. 2 and 3, the lower portion of the valve body is provided with flat faces 26 so that gas may readily pass between the cylinder 19 and the valve body, except when the valve body is in a position to create a piston effect as will hereinafter be described.

Below the flat faces 27 is a piston 28 forming a part of the valve body which piston when the valve is in its uppermost position, as shown in Fig. 2, forms a fairly snug fit with the upper cylinder 19, as shown in Fig. 2, and above the flat faces 26 is a piston 29 which forms a fairly snug fit with the lower cylinder 17 when the valve is in its lowermost position, as shown in Fig. 3. Attention is called to the fact that when the piston 28 is in engagement with the cylinder 19, the piston 29 is out of engagement with the cylinder 17 and vice-versa so that both pistons are never effective at the same time. A spring 30 is interposed between the upper side of the lower cylinder 17 and the collar 25, which spring, of course, tends to urge the parts into the position shown in Fig. 2. The housing 16 is provided with intake ports 31 communicating with the pressure chamber 5 and with the chamber 32 in the lowermost portion of the housing beneath the cylinder 17 and above the valve seat 14. The pistons 28 and 29 can be considered as one double acting piston.

When the flow line is originally lowered into the well and the packer set, but before pressure has been introduced into the pressure chamber 5, the parts are in the position shown in Fig. 2, the spring 30 pressing the valve 22 against the valve seat 24 and elevating the valve 23 above the valve seat 14. When gas under pressure is introduced through the pipe 6 the pressure chamber 5 is filled with gas under any given pressure, for instance, 300 pounds per square inch. This gas, of course, presses downwardly on the valve, through the port 20 and also it passes inwardly through the ports 31 into the chamber 32 and by the valve seat 14 into the passageway 15 and port 11 into the tubing or flow line. The port 11 and seat 14, however, are much larger than the combined area of the ports 31 and hence the pressure in the chamber 32 would be considerably less than the pressure in the chamber 5 so that the tension of the spring 30 would be overcome and the valve body would move from the position shown in Fig. 2 to that shown in Fig. 3 so that no additional gas could pass from the pressure chamber 5 into the flow line. A head of oil would gradually be built up in the flow line from the well pressure and as this head increased in height, the oil pressure on the lower end of the valve 23 would increase until such time as the differential in pressure between the pressure in the chamber 5 and in the flow line had decreased to a point that the spring 30 could open the valve and when it was opened, the compressed gas would pass from the chamber 5, through the ports 31, chamber 32, passageway 15, and port 11 into the column of oil, thereby aerating it.

While the pressures employed in the chamber 5 may be varied to suit conditions and the tension of the spring 30 may be varied as desired, a concrete illustration may possibly illustrate the working of the invention, but is should be specifically understood that these pressures are mentioned only by way of example and perhaps these pressures would never be the exact ones used, and they should not be considered as a limitation on the invention. Suppose, by way of illustration, we had a 300 pound casing pressure in the chamber 5 but that the pressure in the chamber 32 when the valve was open would be 200 pounds. It would certainly be considerably less than 300 pounds because the port 11 and seat 14 are considerably larger than the combined area of the ports 31. Let us assume that the tension of the spring 30 exerted a force of 5 pounds, tending to move the valve upwardly. Let us further assume that the area of the port at the valve seat 14 was $14/100$ square inch and the area of the port 20 was $10/100$ square inch, and that the area of the pistons 28 and 29 were each $\frac{4}{10}$ square inches. When the parts are in the position shown in Fig. 2, there would be two different pressures exerted downwardly on the valve 22. The compressed air would be pressing through the port 20 on an area of $10/100$ square inch at a pressure of 300 pounds per square inch, so that this portion of the valve 22 would be receiving a pressure of 30 pounds. The pressure on the part of the valve member 21 extending below the valve seat 24, as shown in Fig. 2, would be $\frac{4}{10}$ of a square inch multiplied by 200 pounds or 80 pounds. The $\frac{4}{10}$ of a square inch is the total area of $\tfrac{1}{10}$ square inch minus the $\tfrac{1}{10}$ square inch which received the 30 pound pressure through the port 20. It will be remembered that the pressure in the chamber 32 was stated to be 200 pounds and it would be this same pressure in the chamber immediately below the valve seat 24. The total downward pressure therefore on the valve would be 110 pounds. The upward pressure would be the 200 pound pressure in the chamber 32 multiplied by $\tfrac{1}{2}$ square inch or 100 pounds plus the 5 pounds of pressure exerted upwardly by the spring 30, so that there would be a total upward pressure of 105 pounds and a total downward pressure of 110 pounds. There would, therefore, be 5 pounds more pressure tending to push the valve downwardly than there is tending to push it upwardly and it would, therefore, start to move downwardly. As soon, however, as the valve 22 moved away from the valve seat 24, the entire upper portion of the piston body 21 would receive a pressure of 300 pounds per square inch and since its area is $\tfrac{1}{10}$ of a square inch, there would now be 150 pounds tending to press the valve downwardly while there would be only 105 pounds tending to press it upwardly, so that there would now be an overbalanced force of 45 pounds tending to push it downwardly. Particular attention is called to the fact that in this instance there would be an exertion of only 5 pounds initially tending to move the valve downwardly, but as soon as it moved off the valve seat there would be a 45 pound pressure tending to push it downwardly against the increasing tension of the spring 30 so that the valve 23 would now close the valve seat 14 with a snap action and the parts would be in the position shown in Fig. 3.

The valve is now closed and will remain closed until the pressure of the head of oil is sufficient to cause the valve to open. This pressure in the flow line may vary from practically zero to a very large figure. Let us assume that this varying pressure is represented by the variable Z. After the valve is closed there would be a downward pressure on the valve of 150 pounds in the illustration given above. There would also be a pressure tending to push it upwardly which pressure would be exerted on the entire area of the valve body, namely $\tfrac{5}{10}$ square inch minus the area of the port below the valve seat 14 which was stated to be $\tfrac{14}{100}$ square inch so that there would be $\tfrac{36}{100}$ square inch exposed to the gas pressure in the chamber 32 which would now be 300 pounds, for since the gas can not pass from the chamber 32 into the passageway 15, the gas pressure in the chamber 32 would quickly equalize that in the chamber 5, which was stated to be 300 pounds. We would, therefore, have an upward pressure of $\tfrac{36}{100}$ square inch multiplied by 300 pounds or 108 pounds, plus the upward pressure exerted through the passageway 15, which would be $\tfrac{14}{100}Z$, plus the spring pressure of 5 pounds. We therefore have a downward pressure of 150 pounds and an upward pressure of 113 pounds, plus $\tfrac{14}{100}Z$. As long as Z is a small value, of course, the valve will remain closed, but as the value of Z increases by the head of oil increasing in height, a point would be reached where the valve would open. It will be noted that it will be balanced when $\tfrac{14}{100}Z$ equals the difference between the said 150 pounds and 113 pounds, that is, when $\tfrac{14}{100}Z$ equals 37 pounds, that is, there will be a balance when the head of oil exerts a pressure of $264\tfrac{2}{7}$ pounds per square inch. When the tubing pressure exceeds this $264\tfrac{2}{7}$ pounds, for instance, when it reaches a pressure of $264\tfrac{3}{7}$ pounds there is an excess of upward pressure of $\tfrac{1}{7}$ of a pound so that the valve would move upward slightly. The gas does not at once break through and the pressure in the chamber 32 would remain very nearly 300 pounds so that the spring 30 would move the piston upwardly into the position shown in Fig. 2. The gas pressure now breaks through and enters the flow valve through the port 11 and the oil will be aerated until the pressure of the head of oil drop sufficiently for the process to be repeated. Of course, there is no abrupt drop in the oil pressure and the pressure in the chamber 32 would very gradually drop from the 300 pounds of pressure and, therefore, the valve body 21 would not be moved downwardly by any sudden drop in pressure in the chamber 32. As the oil continues to flow out through the pipe 7, the pressure of the head of oil will, of course, continue to drop more and more as this operation progressed so that the pressure in the chamber 32 would be decreased. When the point was reached where there was a greater downward pressure on the valve body 21 than was the upward pressure, the entire operation described above would be repeated. After the upper valve is closed, the next succeeding valve would take up the operation to the end that the uppermost valve would aerate the oil above it and after that valve was closed, the next valve below would commence its operation, and so on until the lowermost valve had performed its operation.

It will be noted that the flat faces 26 and 27 leave a space between the valve body and the cylinder so that air can by-pass. When the port 20 is closed, the pressure beneath the valve seat 24 would, therefore, be substantially the same as in the chamber 32 and when the valve 23 was closed, the chamber 32 would have a pressure the same as the chamber 5, the ports 31 being opened at all times and the pressure in the housing above the lower cylinder 17 would likewise be equal to the pressure in the chamber 5 so that the air would pass downwardly through the port 20, by the flat faces 27 and by the collar 25. The pressures in the main body of the housing, such as around the spring 30, would, therefore, equal the pressures in the chamber 5 when the valve 23 was closed, and would equal the pressures in the chamber 32 when the valve 22 was closed.

In Fig. 4 we have shown a modification in which the valve body 33 is identical with the construction of the valve body 21, except that it is provided with upper spirals 34 and lower spirals 35 which allow air to by-pass in the same manner as the flat faces 27 are allowed to by-pass. Otherwise, the construction of the valve body in each case is identical.

In Fig. 5 we have shown a flow valve 10 of the construction heretofore explained in detail, but in addition thereto, we have shown a constant delivery regulating device which delivers a constant pressure of air to the valve inlet ports 31. We provide a support 36 on which is mounted a tube 37 provided with a cap 38 which cap is provided with a reduced air inlet port 39 leading to the interior of the tube 37. The support 36 is provided with a channel 40 leading to a chamber 41 communicating with the ports 31. In Fig. 5 the parts are shown with the lower valve open so that compressed air can flow from the chamber 5 into the flow line. The pressure in the tube 37 will, therefore, be lower than the pressure in the chamber 5 because of the reduced air inlet port 39. By such a construction the velocity and volume of gas entering the port 11 is regulated so that the gas which is admitted through the port 11 will be of a considerably lower pressure than the gas in the chamber 5, thereby conserving the gas.

In Fig. 6 we have shown the same arrangement as described in connection with Fig. 5, except that instead of showing a gas regulator of the type shown in Fig. 5, we have substituted a regulating device which has a constant delivery pressure to the valve inlet ports. Instead of a tube 37, we have provided a hollow body 42 having a valve seat 43, a cylinder 44, a shoulder 45, and a cap 46. A cap 46 is provided with an air inlet port 47 and the body 42 is provided with air inlet ports 48 supplied above the shoulder 45. A valve body 49 is provided with a needle valve 50 adapted to close the valve seat 43. The valve body 49 is also provided with an enlarged head 51 and a spring 52 is interposed between said head and said shoulder 45, thereby tending to move the valve body 49 upwardly. The valve body is also provided with oppositely extending spirals 53. When the valve 23 is in its open position, as shown in Fig. 6, the spring 52 is pressing the valve body 49 upwardly so as to open the valve seat 43 and air will pass through the air inlet ports 47 and 48 and will spiral downwardly through the spirals 53 into the channel 40 and through the ports 31 so as to aerate the oil as heretofore described. When, however, the valve 23 is closed, as shown in Fig. 7, the air in the body 42 will be the same as the pressure of the air in the chamber 5. The velocity of the air passing downwardly through the spirals when the valve is open controls the opening in the valve seat 43 by pulling the needle valve downward until the desired pressure is reached. The spring 52 should be of a tension so as to govern the pressure desired to be admitted to the flow valve. Not at any time is the regulator or needle valve allowed to close the valve seat 43 entirely. This can be taken care of by compressing the spring solidly before the end of the valve completely closes its seat, as shown in Fig. 6.

We repeat that many changes may be made in the specific form of the invention shown by way of illustration in this application and we, therefore, desire to claim the same broadly except as we may limit ourselves in the annexed claims.

Having now described our invention, we claim:

1. In combination, a well casing, a flow line in said casing, a flow valve on said flow line including a hollow housing, a valve body reciprocable in said housing and having a valve adapted to open or close a passageway leading into said flow line from a pressure chamber between the flow line and the casing, said valve being adapted to be controlled by the differentials in pressures in the passageway and in the pressure chamber, a cylinder within said housing, a piston forming a part of said valve body and adapted to enter said cylinder when the valve closes said passageway, means tending to move said valve body so as to unseat said valve to open said passageway and to move said piston out of said cylinder there being a by-pass between the piston and cylinder so as to allow the gas pressure in the hollow of the housing two be equalized with the gas pressure in the passageway and means including a by-pass adapted to be opened when the piston moves out of the cylinder to give a snap action to said valve body.

2. In combination, a well casing, a flow line in said casing, a flow valve on said flow line including a hollow housing, a vlave body reciprocable in said housing and having a valve adapted to open or close a passageway leading into said flow line from a pressure chamber between the flow line and the casing, said valve being adapted to be controlled by the differentials in pressures in the passageway and in the pressure chamber, a cylinder within said housing, a piston forming a part of said valve body and adapted to enter said cylinder when the valve closes said passageway and means tending to move said valve body so as to unseat said valve to open said passageway and to move said piston out of said cylinder, said valve body being provided with flat faces between the said piston and the valve so that when the piston is moved out of the said cylinder the space between the flat faces of the valve body and the cylinder will serve as a by-pass between the said passageway and the part of the hollow housing above the cylinder so as to allow the pressures in the hollow housing and in the passageway to be equalized and means including said by-pass to give a snap action to said valve body when said piston moves out of the cylinder.

3. In combination, a well casing, a flow line in said casing, a flow valve on said flow line including a hollow housing, a valve body reciprocable in said housing and having a valve adapted to open or close a passageway leading into said flow line from a pressure chamber between the flow line and the casing, said valve being adapted to be controlled by the differentials in pressures in the passageway and in the pressure chamber, a cylinder within said housing, a piston forming a part of said valve body and adapted to enter said cylinder when the valve closes said passageway and means tending to move said valve body so as to unseat said valve to open said passageway and to move said piston out of said cylinder, said valve body being provided with channels forming by-passes from the said passageway into the hollow of the housing when the piston is moved out of the said cylinder so as to allow the pressures in the hollow housing and in the passageway to be equalized and means including said by-pass to give a snap action to said valve body when said piston moves out of the cylinder.

4. In combination, a well casing, a flow line in said casing, a flow valve on said flow line including a hollow housing, a valve body having a valve on each end of said valve body, said valve body being in said housing, one of said valves being adapted to open or close a passageway extending from said flow line to a pressure chamber between the flow line and the casing, the other valve being adapted to open or close a port leading from the pressure chamber into the hollow housing, said port when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, a cylinder within said housing, a piston forming a part of said valve body and adapted to enter said cylinder when the valve body is moved to close said passageway, means tending to move said valve body so as to unseat said valve to open said passageway and to move said piston out of said cylinder, said valve body being controlled by the differentials in the pressures in the pressure chamber and in the passageway.

5. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, two pistons forming a part of said valve body and two cylinders forming a part of said housing, said cylinders being spaced apart so that when one piston enters its cylinder the other piston is moved out of its cylinder.

6. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, two pistons forming a part of said valve body and two cylinders forming a part of said housing, said cylinders being spaced apart so that when one piston enters its cylinder the other piston is moved out of its cylinder, said body being provided with flat faces between each of the pistons and its adjacent valve so that when either of the pistons is disengaged from its cylinder gas may by-pass into the central part of the hollow housing.

7. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, two pistons forming a part of said valve body and two cylinders forming a part of said housing, said cylinders being spaced apart so that when one piston enters its cylinder the other piston is moved out of its cylinder, said valve body being provided with by-passes between each of the pistons and its adjacent valve so that when either of the pistons is disengaged from its cylinder gas may by-pass into the central part of the hollow housing.

8. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, two pistons forming a part of said valve body and two cylinders forming a part of said housing, said cylinders being spaced apart so that when one piston enters its cylinder the other piston is moved out of its cylinder, said valve body being provided with spiral channels forming spiral by-passes between each of the pistons and its adjacent valve so that when either of the pistons is disengaged from its cylinder gas may by-pass into the central part of the hollow housing.

9. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, two pistons forming a part of said valve body and two cylinders forming a part of said housing, said cylinders being spaced apart so that when one piston enters its cylinder the other piston is moved out of its cylinder, said valve body being provided with by-passes between each of the pistons and its adjacent valve so that when either of the pistons is disengaged from its cylinder gas may by-pass into the central part of the hollow housing, and a spring tending to move the valve body so as to cause one of the valves to close the port and to open the valve controlling the passageway.

10. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, means to reduce the pressure entering the passageway below the pressure existing in the pressure chamber, said means including a metering valve, and means to maintain the metering valve at least partly open at all times.

11. In combination, a well casing, a flow line in said casing, a flow valve on said flow line including a hollow housing, a valve body in said housing, a valve on each end of said valve body, one of said valves being adapted to open or close a passageway extending through the housing from said flow line to a pressure chamber between the flow line and the casing, the other valve being adapted to open or close a port leading from the pressure chamber into the hollow housing, said port, when open, allowing the pressure of the compressed air chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, and means to reduce the pressure entering the passageway below the pressure existing in the pressure chamber, said means including a metering valve having a valve stem, said valve stem being provided with spiral by-passes extending through a portion of the length thereof.

12. In combination with a flow line and casing having a pressure chamber therebetween for compressed gas, a flow valve on said flow line including a housing having a passageway leading from the pressure chamber into the flow line, a valve body having a valve adapted to open or close said passageway, said valve body having its opposite ends exposed to the pressure in the pressure chamber and the pressure in the flow line respectively so that said valve will be slightly unseated when the pressure in the flow line exceeds a predetermined pressure, means effective at all times to prevent a flow of compressed gas from one end of said valve body to the other end thereof and means to cause the valve to move from its slightly unseated position to its open position with a snap action.

13. In combination with a flow line and casing having a pressure chamber therebetween for compressed gas, a flow valve on said flow line including a housing having a passageway leading from the pressure chamber into the flow line, a valve body having a valve adapted to open or close said passageway, said valve body having its opposite ends exposed to the pressure in the pressure chamber and the pressure in the flow line respectively so that said valve will be slightly unseated when the pressure in the flow line exceeds a predetermined pressure, means effective at all times to prevent a flow of compressed gas from one end of said valve body to the other end thereof and means to cause the valve to move from its open position to its closed position with a snap action.

14. In combination with a flow line, a casing having a pressure chamber therebetween, a flow valve on said flow line including a housing having a passageway leading from the pressure chamber into the flow line, a valve seat forming a part of said passageway, a valve of larger cross sectional area than the said seat and adapted to close said passageway when seated on said seat, said housing being provided with a chamber and a constantly open port between said chambers, said housing chamber and port forming a part of said passageway and into which housing chamber the valve projects, said valve when closed being subjected to flow line pressures on that part thereof within the area of the seat and to the pressure of the chamber in the housing as to that part thereof without the area of the seat so that as soon as the valve moves off its seat, the entire area thereof is subjected to the pressure in the chamber in the housing, the other end of said valve being exposed to the pressure in the pressure chamber, a spring tending to open said valve, said valve being opened by the spring and the pressures acting on the part thereof adjacent said seat in opposition to the pressure from the pressure chamber acting on the other end thereof.

15. In combination with a flow line and casing having a gas pressure chamber therebetween, a flow valve on said flow line including a housing having a passageway leading from the pressure chamber into the flow line, a differential pressure controlled valve body having two opposed valves thereon and reciprocatable within said housing, said housing having a central chamber and two end chambers, the two valves extending into the two end chambers respectively, the passageway through the housing including one of the end chambers, a valve seat in said passageway, said valve seat adapted to be opened or closed by one of said valves, a vent leading from the pressure chamber into the other end chamber, the other valve being adapted to open or close said vent, and means to establish communication between the central chamber and the end chamber forming a part of the passageway when the vent is closed by its valve, said valve body at all times sealing the vent from the passageway so as to substantially prevent gas from sweeping longtiudinally of said valve body from the vent to the passageway.

16. In combination with a flow line and casing having a gas pressure chamber therebetween, a flow valve on said flow line including a housing having a passageway leading from the pressure chamber into the flow line, a differential pressure controlled valve body having two opposed valves thereon and reciprocatable within said housing, said housing having a central chamber and two end chambers, the two valves extending into the two end chambers respectively, the passageway through the housing including one of the end chambers, a valve seat in said passageway, said valve seat adapted to be opened or closed by one of said valves, a vent leading from the pressure chamber into the other end chamber, the other valve being adapted to open or close said vent, and means to establish communication between the central chamber and the end chamber into which the vent leads when the valve seat in the passageway is closed by its valve, said valve body at all times sealing the vent from the passageway so as to substantially prevent gas from sweeping longitudinally of said valve body from the vent to the passageway.

17. In combination with a flow line and casing having a gas pressure chamber therebetween, a flow valve on said flow line including a housing having a passageway leading from the pressure chamber into the flow line, a differential pressure controlled valve body having two opposed valves thereon and reciprocatable within said housing, said housing having a central chamber and two end chambers, the two valves extending into the two end chambers respectively, the passageway through the housing including one of the end chambers, a valve seat in said passageway, said valve seat adapted to be opened or closed by one of said valves, a vent leading from the pressure chamber into the other end chamber, the other valve being adapted to open or close said vent, and means to establish communication between the central chamber and the end chamber opposite to either valve which may be closed, said valve body at all times sealing the vent from the passageway so as to substantially prevent gas from sweeping longitudinally of said valve body from the vent to the passageway.

18. In combination with a flow line and casing having a pressure chamber therebetween, a flow valve on said flow line including a housing having a passageway leading from the pressure chamber into the flow line, a differential pressure controlled valve body having two opposed valves thereon and reciprocatable within said housing, said housing having a central chamber and two end chambers, the two valves extending into the two end chambers respectively, the passageway through the housing including one of the end chambers, a valve seat in said passageway, said valve seat adapted to be opened or closed by one of said valves, a vent leading from the pressure chamber into the other end chamber, the other valve being adapted to open or close said vent, and means to seal the central chamber from the other end chamber.

19. In combination with the well casing having a flow line in the casing and a compressed gas chamber between the flow line and casing, a flow valve on said flow line including a housing provided with two spaced apart cylinders, a valve body having a piston adapted to close one or the other of said cylinders, the piston being reciprocatable in said housing and being slightly shorter in length than the distance between said cylinders so that when one end of said piston enters its cylinder, the other end of said piston will be disengaged from its cylinder, a first and a second valve extending in opposite directions from the piston, said housing being provided with a passageway leading into the flow line from the compressed gas chamber, the first valve serving as a means to close and open said passageway, the housing being provided with a port which communicates with the compressed gas chamber, the second valve serving as a means to open or close said port, said port and second valve allowing the pressure of the compressed gas chamber to act on the valve body in opposition to the pressure in the passageway.

20. In combination with the well casing having a flow line in the casing and a compressed gas chamber between the flow line and casing, a flow valve on said flow line including a housing provided with two spaced apart cylinders, a valve body having a piston adapted to close one or the other of said cylinders, the piston being movable within said housing and being slightly shorter in length than the distance between said cylinders so that when one end of said piston enters its cylinder, the other end of said piston will be disengaged from its cylinder, a spring tending to urge said piston toward one of said cylinders and away from the other of said cylinders, a first and a second valve extending in opposite directions from the piston, said housing being provided with a passageway leading into the flow line from the compressed gas chamber, the first valve serving as a means to close and open said passageway, the housing being provided with a port which communicates with the compressed gas chamber, the second valve serving as a means to open or close said port, said port and second valve allowing the pressure of the compressed gas chamber to act on the valve body in opposition to the pressure in the passageway.

21. In combination, a well casing, a flow line in said casing, a flow valve on said flow line including a housing mounted on said flow line and having a passageway leading from a compressed gas chamber between the flow line and the casing and through the housing into the flow line, a valve seat in said passageway, a valve body in said housing, said valve body being provided with a valve and cooperating with said valve seat to open or close said passageway, a spring tending to urge said valve away from said valve seat, a second valve carried by said valve body, said housing being provided with a port forming a valve seat, which port communicates with the compressed gas chamber, said second valve being adapted to open or close said port in said housing, said port and second valve allowing the pressure of the compressed gas chamber to act on the valve body in opposition to the pressure in the passageway, and means effective at all times to prevent the flow of compressed gas from said port to said passageway.

22. In combination, a well casing, a flow line in said casing, a flow valve on said flow line including a hollow housing, a valve body in said housing, a valve on each end of said valve body, one of said valves being adapted to open or close a passageway extending through the housing from said flow line to a compressed gas chamber between the flow line and the casing, the other valve being adapted to open or close a port leading from the compressed gas chamber into the hollow housing, said port, when open, allowing the pressure of the compressed gas chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the compressed gas chamber and in the passageway, and means effective at all times to prevent a flow of the compressed gas from one end of said valve body to the other end thereof.

23. In combination, a well casing, a flow line in said casing, a flow valve on said flow line including a hollow housing, a valve body in said housing, a valve on each end of said valve body, one of said valves being adapted to open or close a passageway extending through the housing from said flow line to a compressed gas chamber between the flow line and the casing, the other valve being adapted to open or close a port leading from the compressed gas chamber into the hollow housing, said port, when open, allowing the pressure of the compressed gas chamber to act on the valve body in opposition to the pressure in the passageway, valve seats to receive said valves, said valve seats being spaced further apart than the distance apart of the valves so that when the passageway is closed the port is open and vice-versa, said valve body being controlled by the differentials in the pressures in the pressure chamber and in the passageway, means to reduce the pressure entering the passageway below the pressure existing in the pressure chamber, and means effective at all times to prevent a flow of the compressed gas from one end of said valve body to the other end thereof.

24. In combination, a well casing, a flow line in said well casing, a flow valve on said flow line including a hollow housing, a valve body in said housing, a valve on each end of said valve body, one of said valves being adapted to open or close a passageway extending through the housing from said flow line to a compressed gas chamber between the flow line and the casing, the other valve being adapted to open or close a port leading from the pressure chamber into the hollow housing, said port, when open, allowing the pressure of the compressed gas chamber to act on the valve body in opposition to the pressure in the passageway, valve seats to receive said valve, means effective at all times to prevent a flow of the compressed gas from one valve seat to the other, said valve seats being spaced further apart than the distance apart of the valves so that when the passageway is closed the port is open and vice-versa, said valve body being controlled by the differentials in the pressures in the pressure chamber and in the passageway.

HENRY UDELL GARRETT.
CLYDE V. TEMPLE.